US012717965B2

(12) United States Patent
Trivedi et al.

(10) Patent No.: US 12,717,965 B2
(45) Date of Patent: Aug. 25, 2026

(54) ANONYMOUS DATA COLLECTION FOR VEHICLE SENSOR DATA

(71) Applicant: Atieva, Inc., Newark, CA (US)

(72) Inventors: Amiya Trivedi, Cupertino, CA (US); Alok Kumar Sinha, Fremont, CA (US); Raj Umashankar Gupta, San Jose, CA (US)

(73) Assignee: Atieva, Inc., Newark, CA (US)

( * ) Notice: Subject to any disclaimer, the term of this patent is extended or adjusted under 35 U.S.C. 154(b) by 161 days.

(21) Appl. No.: 18/705,347

(22) PCT Filed: Oct. 27, 2022

(86) PCT No.: PCT/US2022/078814
§ 371 (c)(1),
(2) Date: Apr. 26, 2024

(87) PCT Pub. No.: WO2023/077023
PCT Pub. Date: May 4, 2023

(65) Prior Publication Data

US 2024/0427934 A1 Dec. 26, 2024

Related U.S. Application Data

(60) Provisional application No. 63/263,313, filed on Oct. 29, 2021.

(51) Int. Cl.
*G06F 21/62* (2013.01)
*G07C 5/08* (2006.01)
(Continued)

(52) U.S. Cl.
CPC ......... *G06F 21/6254* (2013.01); *G07C 5/085* (2013.01); *H04L 63/0421* (2013.01); *H04L 67/12* (2013.01); *H04W 12/02* (2013.01)

(58) Field of Classification Search
CPC . G06F 21/6254; G07C 5/085; H04L 63/0421; H04L 67/12; H04W 12/02
See application file for complete search history.

(56) References Cited

U.S. PATENT DOCUMENTS

2015/0067881 A1 3/2015 Badstieber et al.
2016/0004722 A1 1/2016 Uruma
(Continued)

FOREIGN PATENT DOCUMENTS

CN 113273159 A 8/2021

OTHER PUBLICATIONS

International Search Report and Written Opinion for PCT Application No. PCT/US2022/078814, mailed on Feb. 8, 2023, 8 pages.
(Continued)

*Primary Examiner* — Naeem Taslim Alam
(74) *Attorney, Agent, or Firm* — Brake Hughes Bellermann LLP

(57) ABSTRACT

Described systems and techniques enable anonymous collection of sensor data related to vehicle driving events of a vehicle. A start event of the vehicle may be detected, and an anonymous name may be generated, based on the start event. A subset of the sensor data related to a start-specific event of the vehicle may be extracted. The subset of the sensor data may be stored in an event file for the start-specific event that is designated using the anonymous name, and the event file may be uploaded from the vehicle to an external network.

17 Claims, 4 Drawing Sheets

(51) Int. Cl.

| | |
|---|---|
| ***H04L 9/40*** | (2022.01) |
| ***H04L 67/12*** | (2022.01) |
| ***H04W 12/02*** | (2009.01) |

(56) References Cited

U.S. PATENT DOCUMENTS

| | | | | |
|---|---|---|---|---|
| 2018/0027600 | A1* | 1/2018 | Lawlis | H04L 9/0869 713/168 |
| 2019/0019254 | A1 | 1/2019 | Harish et al. | |
| 2019/0256088 | A1* | 8/2019 | Sharma | G06V 10/764 |
| 2020/0168092 | A1 | 5/2020 | Minorics | |
| 2020/0380801 | A1 | 12/2020 | Macneille et al. | |
| 2023/0045323 | A1* | 2/2023 | Li | H04W 12/02 |
| 2024/0420517 | A1* | 12/2024 | Köstermann | H04L 63/00 |

OTHER PUBLICATIONS

Extended European Search Report for European Application No. 22888510.9, mailed Aug. 12, 2025, 12 pages.

* cited by examiner

ANONYMOUS DATA COLLECTION FOR VEHICLE SENSOR DATA

CROSS-REFERENCE TO RELATED APPLICATION

This application is a 35 U.S.C. § 371 National Phase Entry Application from PCT Application No. PCT/US2022/078814, filed on Oct. 27, 2022, entitled "ANONYMOUS DATA COLLECTION FOR VEHICLE SENSOR DATA", and designating the U.S., which claims priority to U.S. Patent Application No. 63/263,313, filed on Oct. 29, 2021, and entitled "ANONYMOUS DATA COLLECTION FOR VEHICLE SENSOR DATA," the disclosures of which are incorporated by reference herein in their entireties.

TECHNICAL FIELD

This description relates to data collection from vehicle sensors.

BACKGROUND

Vehicles, such as automobiles, may acquire vast quantities of data related to operations of the vehicles. For example, vehicles may acquire data from multiple onboard sensors. Such data may be used, for example, to help ensure safe operation of a vehicle, and/or to facilitate semi-autonomous or autonomous driving of a vehicle.

It may be desirable to upload captured sensor data for remote analysis and processing. By performing such remote analysis and processing, it is possible to improve future vehicle performance. However, in some cases, captured sensor data may also include information that could be used to identify individual vehicles and/or users.

SUMMARY

According to some general aspects, a computer program product may be tangibly embodied on a non-transitory computer-readable storage medium and may comprise instructions that, when executed by at least one computing device, may be configured to cause the at least one computing device to detect, at a vehicle outfitted with a plurality of sensors configured to generate sensor data characterizing an environment of the vehicle, a start event of the vehicle, and generate, based on the start event, an anonymous name. The instructions, when executed by the at least one computing device, may be configured to cause the at least one computing device to extract, from the sensor data, a subset of the sensor data related to a start-specific event of the vehicle with respect to the environment. The instructions, when executed by the at least one computing device, may be configured to cause the at least one computing device to store the subset of the sensor data in an event file for the start-specific event that is designated using the anonymous name, and upload the event file from the vehicle to an external network.

In example implementations, the start event includes turning on the vehicle. A timestamp may be generated in response to the start event, and the anonymous name may be generated, using the timestamp. The anonymous name may be generated using a hashing algorithm. The anonymous name may be generated at a central Autonomous Control Unit (ACU) of the vehicle, and distributed to at least a second ACU of the vehicle, via a vehicle network. The start-specific event may include any detected event that occurs during a start-specific time window between the start event and a stop event of the vehicle when the vehicle is turned off. The anonymous name may be generated as being unique to the vehicle. A folder name of at least one folder may be generated, the folder name including the anonymous name, and the event file may be stored in the at least one folder. A folder hierarchy including the at least one folder may be generated, in which a root folder at a first hierarchical level is named using the anonymous name, a plurality of event folders at a second hierarchical level are named using individual event names, and a plurality of sensor folders at a third hierarchical level are provided sensor-specific names. The event file may be stored in a sensor folder of the plurality of sensor folders. A second subset of the sensor data may be stored in a second event file for a second start-specific event that is designated using the anonymous name, and the event file and the second event file may be aggregated, based on the anonymous name.

According to other general aspects, a computer-implemented method may include detecting, at a vehicle outfitted with a plurality of sensors configured to generate sensor data characterizing an environment of the vehicle, a start event of the vehicle, and generating, based on the start event, an anonymous name. The method may include extracting, from the sensor data, a subset of the sensor data related to a start-specific event of the vehicle with respect to the environment, storing the subset of the sensor data in an event file for the start-specific event that is designated using the anonymous name, and uploading the event file from the vehicle to an external network.

In example implementations, the method may include generating a timestamp in response to the start event, and generating the anonymous name, using the timestamp. The method may include generating the anonymous name, using a hashing algorithm. The start-specific event may include any detected event that occurs during a start-specific time window between the start event and a stop event of the vehicle when the vehicle is turned off. The method may include generating the anonymous name as being unique to the vehicle. The method may include generating a folder name of at least one folder, the folder name including the anonymous name, and storing the event file in the at least one folder. The method may include storing a second subset of the sensor data in a second event file for a second start-specific event that is designated using the anonymous name, and aggregating the event file and the second event file, based on the anonymous name.

According to other general aspects, a vehicle may include a chassis, a frame mounted on the chassis, a motor mounted within the frame, a plurality of sensors configured to generate sensor data characterizing an environment of the vehicle, at least one memory including instructions, and at least one processor that is operably coupled to the at least one memory and that is arranged and configured to execute instructions. When executed, the instructions may cause the at least one processor to detect, at the vehicle, a start event of the vehicle, and generate, based on the start event, an anonymous name. When executed, the instructions may cause the at least one processor to extract, from the sensor data, a subset of the sensor data related to a start-specific event of the vehicle with respect to the environment, store the subset of the sensor data in an event file for the start-specific event that is designated using the anonymous name, and upload the event file from the vehicle to an external network.

In example implementations, the anonymous name may be generated as being unique to the vehicle. A folder name of at least one folder may be generated, the folder name including the anonymous name, and the event file may be stored in the at least one folder.

The details of one or more implementations are set forth in the accompanying drawings and the description below. Other features will be apparent from the description and drawings, and from the claims.

DETAILED DESCRIPTION

Described systems and techniques enable anonymous collection of sensor data related to vehicle driving events of a vehicle. Consequently, it is possible to identify, transmit, and analyze desired subsets of sensor data related to driving events of many different vehicles, without sacrificing a privacy or identity of any of the users of those vehicles.

The described techniques also ensure that multiple instances of event data may be captured and correlated with respect to an individual vehicle, across different restart events of each vehicle. In other words, multiple events captured between the time a vehicle is started and a subsequent stopping of the vehicle may be correlated. In this way, for example, cause and effect relationships may be determined between two or more events with respect to the corresponding vehicle, without sacrificing a privacy or personal information of a user of the vehicle.

Figure 1:
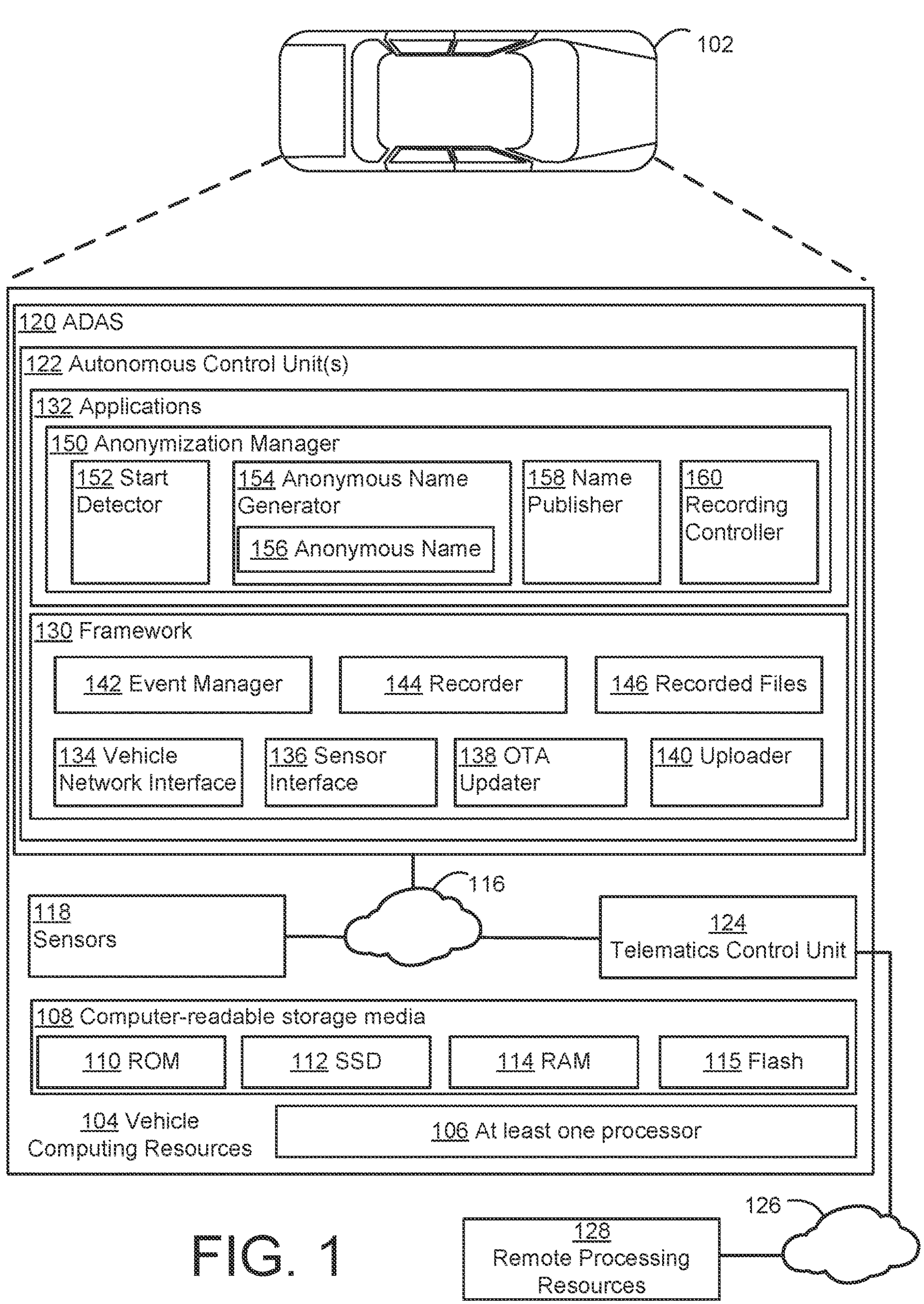
FIG. 1 is a block diagram of a system for anonymously collecting data about driving events.

In the example of FIG. 1, a vehicle 102 is illustrated as a car, but should be understood to represent any type of automobile or automotive vehicle. In other example implementations, the vehicle 102 may represent any mobile, autonomous or semi-autonomous device, including, e.g., a robot, an airplane, a boat, or a drone.

The vehicle 102 may thus include a body of desired type (e.g., a chassis, a frame mounted on the chassis with doors, windows, a roof, trunk, and/or hood), various components for enabling movement of the vehicle, such as wheels/wings, and a suitable motor, such as an electric motor (and associated battery) or internal combustion engine (not separately illustrated in FIG. 1). Various types of vehicle computing resources 104, which may include many different types and configurations of hardware and software resources, may also be included. In the simplified example of FIG. 1, the vehicle computing resources 104 are illustrated as including at least one processor 106, and non-transitory computer-readable storage medium 108.

For example, the at least one processor 106 may represent multiple processors, chipsets, or processing cores. The computer-readable storage medium 108 may represent multiple types of memories, including, e.g., read-only memories (ROM) 110, solid state drives (SSD) 112, random access memories (RAM) 114, or flash memories (Flash) 115.

The vehicle computational resources 104 may also include network hardware used to create a vehicle network 116 within the vehicle 102. For example, the vehicle network 116 may represent, e.g., wiring and related hardware/software to provide one or more busses and related protocols for distributing data within the vehicle 102. As such, the vehicle network 116 provides opportunities for intra-vehicle communication between and among various vehicle subsystems, as described in detail, below.

For example, the vehicle network 116 may utilize existing types of vehicle bus topologies and related busses, including, e.g., the Controller Area Network (CAN) bus, the Local Interconnect Network (LIN) bus, or the Media Oriented Systems Transport (MOST). The network 116 may also represent automotive-grade Ethernet and various types of Transport Control Protocol/Internet Protocol (TCP/IP) networks.

In some implementations, two or more of these technologies may be combined or utilized together. For example, a physical Ethernet connection may be established throughout the vehicle 102 (e.g., as an Ethernet ring that encircles a chassis and/or cabin of the vehicle 102), and may be used to aggregate or distribute multiple CAN busses.

In many implementations, the vehicle 102 may include multiple sensors 118, which may be used to detect information regarding an environment or surroundings of the vehicle 102. For example, the sensors 118 may include video cameras, Light Detection and Ranging (lidar) sensors, ultrasonic sensors, radar sensors, GPS sensors, and various other types of sensors. The sensors 118 may be distributed within and around a chassis, body, and/or cabin of the vehicle 102, where needed to perform intended functions.

In the simplified example of FIG. 1, the vehicle computational resources 104, including the at least one processor 106, the non-transitory computer-readable storage medium 108, the vehicle network 116, and the sensors 118, are illustrated together for ease of illustration and description. Within the vehicle 102, however, as already noted with respect to the vehicle network 116 and the sensors 118, multiple pairs or groups of processors and memories may be distributed in desired locations within the vehicle 102, together with other related hardware, to provide intended functionalities.

For example, multiple control boards may be assembled using desired ones of the at least one processor 106 and the computer-readable storage media 108, and positioned appropriately within the vehicle 102 to perform desired functions. Such control boards and related hardware and software may be referred to generally as electronic control units (ECUs). For example, one or more ECUs may be used to support and enable corresponding vehicle subsystems. Examples of current vehicle subsystems may include subsystems for navigation, including an advanced driver assistance system (ADAS) 120 for autonomous or semi-autonomous systems, which may include one or more Autonomous Control Units (ACUs) 122. Various other vehicle subsystems may relate to, or include, subsystems for vehicle safety features, climate control, and information/entertainment (infotainment) systems.

In some implementations, the ACU 122 may represent two or more ACUs, e.g., three ACUs. In such cases, one of the ACUs may be designated as a central ACU of the ADAS 120. Then, communications between various ACU components of the several ACUs may be centralized and coordinated to a desired extent through the central ACU, which may be in communication with the remaining ACUs through the vehicle network 116.

Another example of an ECU is illustrated in FIG. 1 as telematics control unit (TCU) 124. The TCU 124 may represent a single site of network connectivity for connecting the vehicle 102 to external network(s) 126. Maintaining the TCU 124 as a single site of network connectivity may provide efficiency by reducing or eliminating a need to reproduce connectivity components (e.g., hardware modems) at multiple locations, or for multiple vehicle subsystems, within the vehicle 102.

Moreover, maintaining a single site of network connectivity may assist in protecting the vehicle 102 from various types of cyberattacks. For example, the TCU 124 may be equipped with firewalls and various other protection mechanisms used to prevent attackers from, e.g., controlling operations or the vehicle 102, or accessing confidential information within the vehicle 102.

The TCU 124 may include multiple modems and/or related hardware (including appropriate ones of the at least one processor 106 and the computer-readable storage media 108) for connecting to two or more external networks 126. For example, the TCU 124 may provide external connectivity to WiFi networks, long term evolution (LTE) networks, or 3G/4G/5G networks.

Accordingly, it is possible to use the external networks 126 to exchange vehicle information with remote processing resources 128. For example, as described in detail, below, it is possible to perform over-the-air (OTA) updates of software stored using the computer-readable storage media 108, or to upload navigation data from the vehicle 102 to the remote processing resources 128 for analysis or long-term storage.

As further illustrated, the ACU 122 may include a framework 130. The framework may include an operating system (OS) that, e.g., supports operations of one or more applications 132 of the ACU 122, and that enables connectivity with the vehicle network 116. For example, the framework 130 may provide or include an implementation of the Automotive Open Source Architecture (Autosar), which is designed to support deployment of the applications 132 using an operating system based on the Portable OS Interface (POSIX) standard, which is written using C++ and enables service-oriented communication and application programming interfaces (APIs) for communicating with, e.g., the vehicle network 116 and the applications 132. Additionally, or alternatively, the framework 130 may include other OS implementations, such as automotive grade Linux.

In the example of FIG. 1, the framework 130 is illustrated as including a vehicle network interface 134 for communicating with the vehicle network 116. The framework 130 also includes a sensor interface 136, which represents one or more interfaces for obtaining sensor data from the appropriate ones of the sensors 118.

An OTA updater 138 represents a component for receiving updates of the vehicle 102 via the external networks 126. For example, new or updated software may be downloaded via the TCU 124 and installed by the OTA updater 138 within an appropriate or designated memory of the computer-readable storage media 108.

An uploader 140 may be configured to execute any desired transmission of data from the vehicle 102 to the external networks 126, using the vehicle network 116 and the TCU 124. For example, the uploader 140 may be configured to upload processed sensor data, or any vehicle data, to the remote processing resources 128.

An event manager 142 represents a component for detecting, determining, processing, and/or characterizing network data received via the vehicle network interface 134 and/or sensor data received via the sensor interface 136, and for then using the network data and/or sensor data, e.g., to control other functions of the framework 130 and the applications 132. Put another way, the event manager 140 represents a control node for controlling and coordinating operations of the framework 130 and the applications 132, to thereby achieve coordinated functions such as, e.g., sensor fusion, multi-layer perception processing algorithms, and autonomous driving control algorithms for controlling steering, braking, or other functions of the vehicle 102.

In specific examples, the event manager 142 may be configured to control operations of a recorder 144 in recording various types of vehicle data, including sensor data, for storage as recorded files 146. For example, the recorded files 146 may be used to store sensor data related to particular events, including driving-related events such as sudden accelerations/decelerations, or impact events including collisions of the vehicle 102. Then, some or all of the recorded files 146 may be uploaded to the external networks 126, and to the remote processing resources 128, using the uploader 140.

In the simplified example of FIG. 1, the various components or modules 134, 136, 138, 140, 142, 144, 146 of the framework 130 are illustrated as singular, individual modules implemented entirely in the context of the framework 130. In various implementations, however, it will be appreciated that specific features and functions of one or more of the framework modules 134, 136, 138, 140, 142, 144, 146 may be implemented in the context of the applications 132, i.e., as application-layer functions.

As referenced above, sensor data may be used for vehicle control as part of the ADAS 120. For example, processed sensor data may be routed through the vehicle network interface 134 and over the vehicle network 116 to an appropriate ECU for vehicle control. For example, such vehicle control may include steering or braking of the vehicle 102. Accordingly, processed sensor data and related data represents an extremely large volume of high priority data, which must be transmitted and processed quickly and accurately to maintain safe operation of the vehicle 102.

Nonetheless, much of this processed sensor data cannot, or should not, be transmitted or stored for long term use. In particular, quantities of local storage at the computer-readable storage media 108 may be very limited, while quantities of processed sensor data, including perception data (related to correctly perceiving a surrounding environment of the vehicle 102) and vehicle control data, may be generated continuously in vast quantities.

Moreover, there may be little need or motivation to attempt to store much or all of the vehicle control data. For example, the vehicle 102 may travel for a period of time uneventfully, with all sensor and control functionalities occurring as expected. Further, the vehicle 102 may travel for many hours, and the vehicle 102 may represent a many thousands of vehicles, so that it would be impractical, impossible, and undesirable to attempt to store such data either locally at the vehicle 102 and/or using the remote processing resources 128. Still further, attempting to store and analyze large or continuous quantities of vehicle sensor and control data may increase a likelihood of identifying the vehicle 102 uniquely, and thereby compromising a privacy of a user of the vehicle 102.

On the other hand, capturing important and meaningful vehicle events that may occur during use of the vehicle 102 may represent critical opportunities to improve relevant sensor and control (e.g., navigation) algorithms. For example, such event-specific vehicle data may represent, or correspond to, malfunctions or crashes of the vehicle 102.

Other events may relate to unexpected or undesirable driving conditions, such as sudden turns, accelerations, or decelerations. Such events may be correlated with, or caused by, external events, such as hazardous road conditions. In other examples, such events may be cause by driver error or distraction.

By capturing sensor and control data related to such events, the ADAS 120 enables fast, efficient, cost-effective analysis of operations of the vehicle 102, without overwhelming available resources for data storage, transmission, and analysis. As a result, it is possible to continuously improve the vehicle 102, including improvements to vehicle self-navigation and safety of users of the vehicle 102.

In order to obtain the above and other benefits and advantages while ensuring continued privacy of a user of the vehicle 102, the system of FIG. 1 includes an anonymization manager 150. As referenced above, and described in detail, below, the anonymization manager 150 may be configured to capture and correlate start-specific events associated with the vehicle 102 by generating a new anonymous name to be associated with multiple (e.g., all) start-specific events occurring between a start (e.g., turning on) of the vehicle 102 and a stop (e.g., turning off) of the vehicle 102. Then, all the start-specific events may easily be correlated with one another, which provides the advantage of potentially determining relationships (e.g., causal relationships) between events, without providing identifying information about the vehicle 102 or user(s) thereof.

In the example of FIG. 1, the anonymization manager 150 includes a start detector 152 that may be configured to detect start events of the vehicle 102. In the following description, the term start-specific event may refer to any of the types of events referenced above that is identified and/or captured by the event manager 142 and the recorder 144 with respect to a particular start event captured by the start detector 152.

In response to a start detection of the start detector 152, an anonymous name generator 154 may be configured to generate a unique, anonymous name 156. For example, the anonymous name generator 154 may be configured to execute a one-way algorithm that generates a name that is statistically extremely unlikely to be duplicated across many different start events of many different vehicles.

For example, the anonymous name generator 154 may execute such an algorithm based on a timestamp of the start event, or another selected timestamp. Additionally, or alternatively, the anonymous name generator 154 may generate the anonymous name based on a vehicle identification number (VIN) of the vehicle 102, or using some other unique identifier of the vehicle 102, or an owner thereof. For example, the anonymous name generator 154 may utilize a hashing algorithm or any one-way algorithm to process one or more of the above quantities (e.g., timestamp and/or VIN), alone or in combination, to generate an alphanumeric string of sufficient length to be effectively unique and anonymous.

Figure 2:
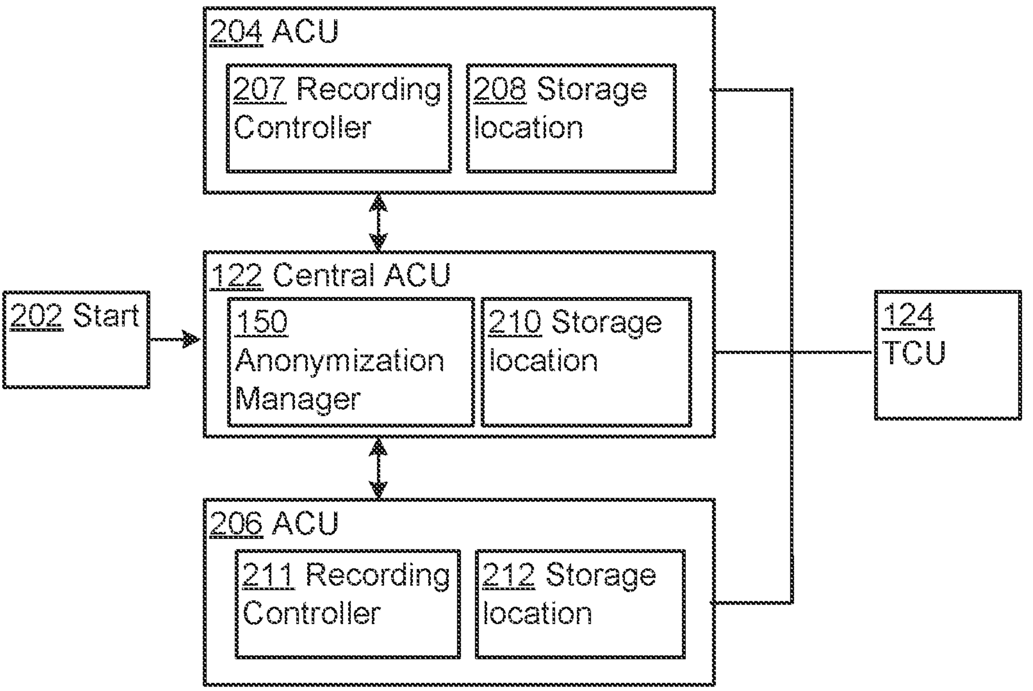
FIG. 2 is a block diagram illustrating a more detailed example of the system of FIG. 1.

As referenced above, and illustrated in FIG. 2 in detail, the ACU 122 may represent multiple ACUs. For example, the ACU 122 may be a central ACU that communicates with one, two, or more ACUs. Therefore, the anonymization manager 150 may include a name publisher 158 configured to transmit or otherwise publish the anonymous name 156 to the other ACUs.

Then, during event capture by the event manager 142 and the recorder 144, a recording controller 160 may be configured to cause the recorder 144 to record the recorded files based off of, or using, the anonymous name 156. It will be appreciated that although the recording controller 160 is illustrated as being implemented at the layer of the applications 132, the recorder 144 may also be configured to operate at the layer of the framework 130 to provide the functions of the recording controller 160. These options are by way of example only, and other design choices are also possible.

In this way, the recorded files 146 of the ACU 122, as well as recorded files of any other ACUs of the ADAS 120 as shown below, may be stored using the anonymous name. For example, the recorded files 146 may all be stored in a file or folder, or folder tree, following a naming convention based on the anonymous name 156.

As described in further detail below, the resulting recorded files 146 may all be uniquely associated with the start event detected by the start detector 152, which is unique to the vehicle 102, so that the recorded files 146 are also unique to the vehicle 102. Nonetheless, because the anonymous name 156 changes with each such start event, anonymity of the vehicle 102 may be maintained.

During operations of the uploader 140 as described above, start-specific recorded files 146, e.g., start-specific event files corresponding to specific events of the vehicle 102, may be uploaded through the TCU 124 and one or more of the external networks 126 to the remote processing resources 128. There, it is straightforward to use the remote processing resources 128 to process individual events from a single vehicle, using the anonymous name included in each start-specific batch or group of recorded files (e.g., event files).

FIG. 2 illustrates detection of a start event 202 by the anonymization manager 150 at a central ACU 122, as described above. As also described, the central ACU 122 may then publish the anonymous name 156 to a second ACU 204 and to a third ACU 206. For example, the central ACU 122 may communicate the anonymous name 156 to the ACUs 204, 206 using the vehicle network 116 and available real-time interfaces (RTIs).

At each of the ACUs 204, 206, it is not necessary to implement the full anonymization manager 150. Instead, as shown, the ACUs 204, 206 may be provided with a recording controller 207 and a recording controller 211, respectively, configured to provide the functions of the recording controller 160 of the anonymization manager 150.

At the ACU 204, the recording controller 207 may designate a storage location 208 using resources of the ACU 204 and based on the anonymous name 156. For example, the storage location 208 may represent a memory location at which recorded event files of the ACU 204 are stored, using the anonymous name 156. Similar comments apply to storage location 210 of the central ACU 120 and a storage location 212 of the ACU 206.

For example, the storage locations 208, 210, 212 may be designated using file and/or folder names that include, or are derived from, the anonymous name 156. For example, hierarchical folder names may be established in which each hierarchical layer(s) expands upon the anonymous name 156 with additional event identifiers.

For example, a hierarchical structure may be defined with the anonymous name at a highest or root level, an event name (or reference) at a second level, and a sensor name (or type) of sensor(s) involved in the event at a third level, e.g., as anonymous name/event/sensor. Therefore, multiple sensors in a single event may be captured as anonymous name/event/sensor_1 and anonymous name/event/sensor_2. Similarly, multiple events may be captured for a single vehicle as anonymous name/event_1 and anonymous name/event_2, with the possibility of multiple sensors for each such event.

In other examples, other data or metadata may be used to generate the referenced files or folders in the context of the event hierarchy. For example, data formats or format types may be used. For example, video data may be captured and compressed using multiple formats, and files/folders may be further identified within the event hierarchy using such storage or compression formats or format types.

It then becomes possible to merge such hierarchical structures into a single hierarchical structure, or otherwise to relate or merge multiple start-specific events from multiple ACUs of a single vehicle. For example, a merger or aggregator component may be implemented at the vehicle 102, e.g., at the central ACU 122, including at the anonymization manager 150 and/or the uploader 140. Such an aggregator component may be configured to execute the type of event file and/or file name mergers just referenced. The uploader 140 may then upload groups or batches of related or merged event files using the TCU 124.

In other implementations, the remote processing resources 128 may be configured to perform such merger operations, or otherwise to leverage the event hierarchy generated based on the anonymous name 156. For example, the remote processing resources 128 may be configured to search across multiple uploads from multiple vehicles to find common names or naming structures. Uploaded files may be stored at the remote processing resources and made available by browser, so that a uniform resource locator (URL) of stored files/folders reflects the event hierarchy.

Figure 3:
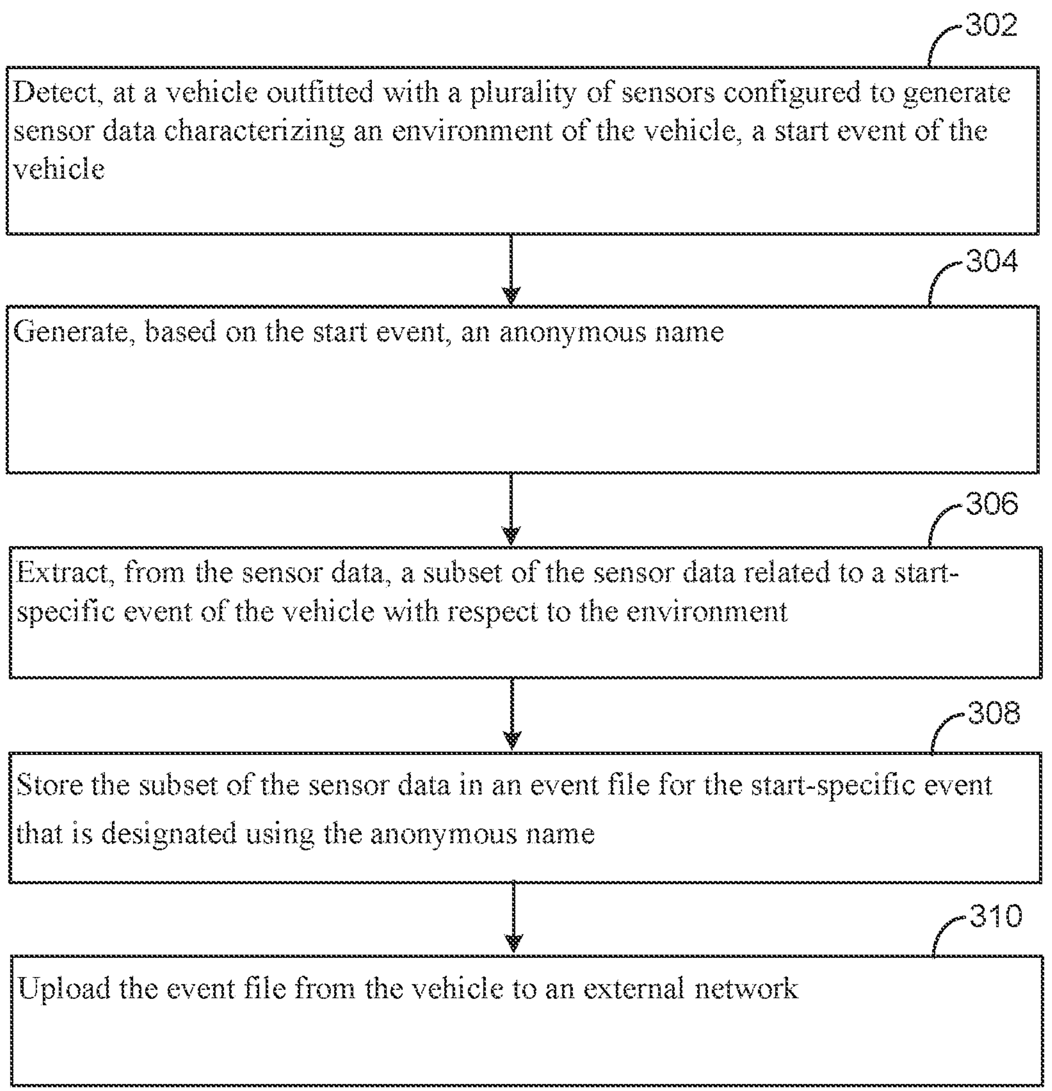
FIG. 3 is a flowchart illustrating example operations of the systems of FIGS. 1-2.

FIG. 3 is a flowchart illustrating example operations of the systems of FIGS. 1 and 2. In the example of FIG. 3, operations 302-310 are illustrated as separate, sequential operations. In various implementations, the operations 302-310 may include sub-operations, may be performed in a different order, may include alternative or additional operations, or may omit one or more operations. Further, in all such implementations, included operations may be performed in an iterative, looped, nested, or branched fashion.

In FIG. 3, at a vehicle outfitted with a plurality of sensors configured to generate sensor data characterizing an environment of the vehicle, a start event of the vehicle may be detected (302). For example, the start detector 152 may detect that the vehicle 102 has been started or turned on. The sensor data may reflect any circumstance external or internal to the vehicle, or both.

Based on the start event, an anonymous name may be generated (304). For example, the anonymous name generator 154 may generate the anonymous name 156, using a timestamp at which the start event occurred, perhaps in combination with a VIN of the vehicle or other unique identifier. For example, the anonymous name generator 154 may use a hashing algorithm or other one-way algorithm to generate the anonymous name 156.

From the sensor data, a subset of the sensor data related to a start-specific event of the vehicle with respect to the environment may be extracted (306). For example, the event manager 142 and/or the recording controller 160 may cause the recorder 144 to record the subset of sensor data in an event file of the recorded files 146. For example, a quantity of sensor data may be continuously captured using the RAM 114, e.g., installed on the ACU 122. Upon detection of an event, the recorder 144 may extract the subset of sensor data from the sensor data stored using RAM 114. For example, based on the type of event classified, a corresponding duration of sensor data may be retrieved. For example, a particular type of event for a recording trigger at time "t" may require collection of a preceding 30 seconds (t−30) of sensor data stored in the RAM 114, together with a subsequent 60 seconds (t+60) of sensor data that is stored in the RAM 114 following the event.

The subset of the sensor data may be stored in an event file for the start-specific event that is designated using the anonymous name (308). For example, as just referenced, the subset of sensor data may be stored in the recorded files 146, using, e.g., the SSD 112 or the flash memory 115. For example, upon detection of a sudden acceleration, relevant sensors (e.g., cameras/lidar sensors) may be chosen, and a corresponding duration of sensor data (e.g., video and lidar data packets or point clouds) may be extracted and stored as the subset of sensor data. The resulting recorded event file may be named based on a combination of the anonymous name, an event identifier, and a sensor/sensor data identifier.

The event file may be uploaded from the vehicle to an external network (310). For example, the uploader 140 may use the vehicle network 116 to access the TCU 124 and upload the event file over the external network 126 to the remote processing resources 128.

Figure 4:
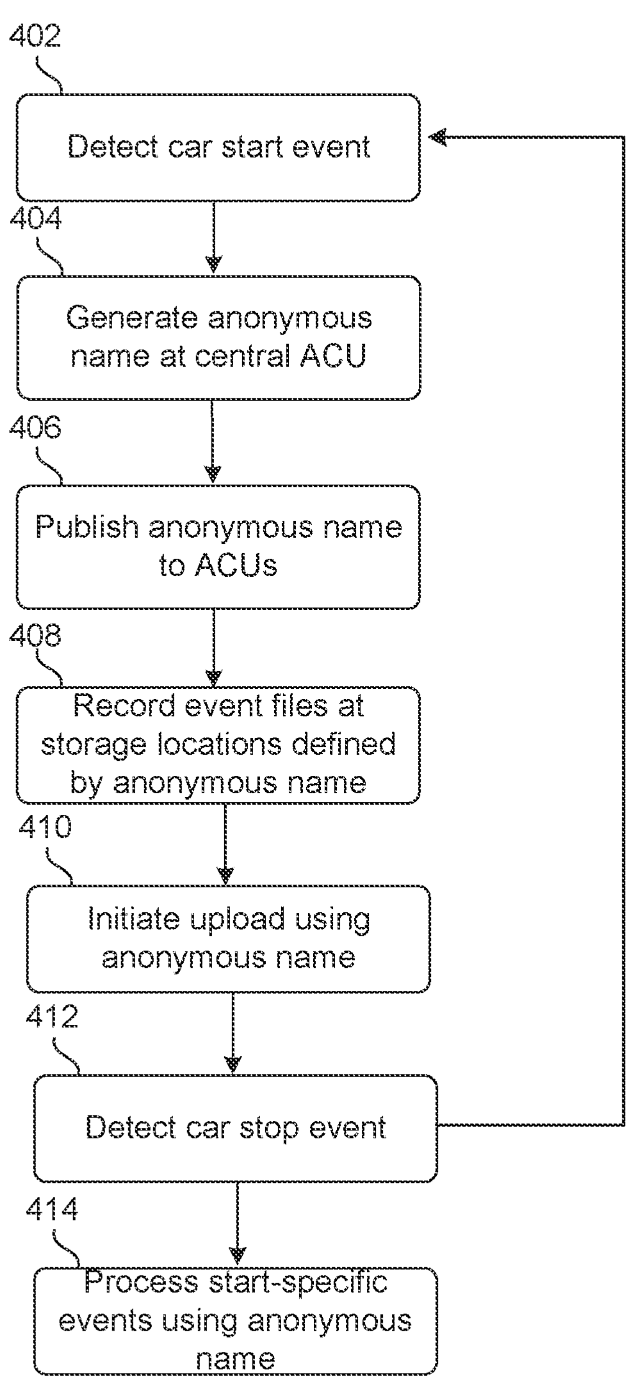
FIG. 4 is a flowchart illustrating more detailed example operations of the flowchart of FIG. 3.

FIG. 4 is a flowchart illustrating more detailed examples of event file capture and processing in the systems of FIGS. 1 and 2. In the example of FIG. 4, various operations are illustrated as separate, sequential operations. In various implementations, however, the same or similar ones of the operations may include sub-operations, may be performed in a different order, may include alternative or additional operations, or may omit one or more operations. Further, in all such implementations, included operations may be performed in an iterative, looped, nested, or branched fashion.

In FIG. 4, a car start event is detected (402), e.g., when the vehicle 102 is turned on, such as the start event 202 of FIG. 2. In response, the anonymous name 156 may be generated at a central ACU 122 (404). For example, the anonymous name generator 154 may generate the anonymous name 156, using a timestamp of the start event and/or other unique or nearly-unique information, or combinations thereof.

The anonymous name 156 may then be published by the central ACU 122 and provided to other ACUs 204, 206 in the vehicle 102 (406). In this way, as described, any event associated with the start event 202 may be anonymously related to the vehicle 102, without having to generate multiple anonymous names. As referenced above, and also described below, this approach allows all events specific to the start event 202 to be related to one another for the vehicle 102, so that events may be analyzed together (e.g., for causal connections between the events).

Event files may be stored at storage locations 208, 210, 212 on respective ACUs 122, 204, 206 that are defined by the anonymous name 154 (408). For example, the storage locations 208, 210, 212 may represent folders, e.g., in a hierarchy, that are named using the anonymous name 156. For example, if the anonymous name is generated as 123ABC (representing a unique alphanumeric identifier), then a parent folder may be named 123ABC, while one or more child folders are named based on corresponding events or event types, such as ABC123/event1 and ABC123/event2. Within each event or event type, data that is specific to a sensor or sensor type may be stored in separate folders, such as ABC123/event1/sensor1 and ABC123/event1/sensor2.

An upload may be initiated using the anonymous name 156 (410). For example, as referenced above, the uploader 140 may use the TCU 124 to upload the captured event files to the remote processing resources 128.

The event files may be uploaded at various times, relative to captured of the included subsets of sensor data. For example, the vehicle 102 may be turned on for several hours during a single drive, and during that time, multiple events may be captured as event files. The uploader 140 may upload the event files for a single event after each event. In other examples, e.g., when events happen very closely in time and/or when the external network 126 is not available between two or more events, then two or more events may be uploaded together. For example, an upload queue may be used to store or identify/prioritize event files between successive uploads.

A car stop event may then be detected (412). For example, the vehicle 102 may be turned off. The process of FIG. 4 then waits for a subsequent car start event to occur, as shown.

Start-specific events may then be processed, using the anonymous name (414). For example, various processing of the start-specific event files may be performed at the remote processing resources 128. For example, even if a time between a start event and stop event is several hours, all captured events within that start-specific window of time may be merged, aggregated, related as being specific to the vehicle 102, or otherwise analyzed together, by virtue of the inclusion of the anonymous name 156 in the names and/or content of the various event files.

In the example of FIG. 4, the processing (414) is illustrated as occurring after the stop event detection (412). However, it will be appreciated from the above that at least some such processing may occur prior to the stop event. Moreover, at least some of the processing may occur at the vehicle 102, rather than at the remote processing resources 128, based on the anonymous name 156.

In various example implementations of FIGS. 1-4, described techniques enable an innovative folder naming structure while collecting sensor and event data to link sensor data from different ECUs (Electronic Control Units), such as ACUs, while retaining an ability to combine all sensor data from a single vehicle into the cloud, and without requiring any vehicle information and/or user information.

Therefore, privacy information of users may be protected, while also ensuring the ability to link data from a single vehicle and individual events of each single vehicle, since a reason for collecting event data includes fine tuning the ADAS (Advanced Driver Assistance System) feature.

As described above, even with multiple ACUs inside an ADAS, collected sensor data for each start-specific event from all the ACUs may be routed to a same folder, or folders named using a single anonymous name, for any event before being uploading to the cloud. An anonymous name generating algorithm may create a unique named folder in one of the ACUs, and communicate the folder name to remaining ACUs, so that whenever any event happens each ACU may store the data in a same or similarly-named folder in their respective processing unit. To assist in keeping the user's privacy and vehicle information privacy intact, the described algorithms may create different unique folder names on each restart of the vehicle in question. Accordingly, it becomes difficult or impossible to map received event data to a particular vehicle, as the anonymous name changes on every restart of the car.

For example, on every restart of a vehicle, an algorithm may create a unique folder name only on one ACU and pass the name to other ACUs over RTI communication. Later, when any event happens, a recorder may append a sensorID and timestamp to the unique folder name. This approach makes an even more robust unique name, and enables storage of event data locally at the vehicle until it is uploaded to the cloud at a later time.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

detect, at a vehicle outfitted with a plurality of sensors configured to generate sensor data characterizing an environment of the vehicle, a start event of the vehicle;

generate, based on the start event, an anonymous name;

extract, from the sensor data, a subset of the sensor data related to a start-specific event of the vehicle with respect to the environment;

store the subset of the sensor data in an event file for the start-specific event that is designated using the anonymous name;

generate a folder name of at least one folder, the folder name including the anonymous name;

store the event file in the at least one folder; and upload the event file from the vehicle to an external network.

2. The computer program product of claim 1, wherein the start event includes turning on the vehicle.

3. The computer program product of claim 1, wherein the instructions, when executed by the at least one computing device, are configured to cause the at least one computing device to:

generate a timestamp in response to the start event; and generate the anonymous name using the timestamp.

4. The computer program product of claim 1, wherein the instructions, when executed by the at least one computing device, are configured to cause the at least one computing device to:

generate the anonymous name, using a hashing algorithm.

5. The computer program product of claim 1, wherein the instructions, when executed by the at least one computing device, are configured to cause the at least one computing device to:

generate the anonymous name at a central Autonomous Control Unit (ACU) of the vehicle; and distribute the anonymous name to at least a second ACU of the vehicle, via a vehicle network.

6. The computer program product of claim 1, wherein the start-specific event includes any detected event that occurs during a start-specific time window between the start event and a stop event of the vehicle when the vehicle is turned off.

7. The computer program product of claim 1, wherein the instructions, when executed by the at least one computing device, are configured to cause the at least one computing device to:

generate the anonymous name as being unique to the vehicle.

8. The computer program product of claim 1, wherein the instructions, when executed by the at least one computing device, are configured to cause the at least one computing device to:

generate a folder hierarchy including the at least one folder, in which a root folder at a first hierarchical level is named using the anonymous name, a plurality of event folders at a second hierarchical level are named using individual event names, and a plurality of sensor folders at a third hierarchical level are provided sensor-specific names, and further wherein the event file is stored in a sensor folder of the plurality of sensor folders.

9. The computer program product of claim 1, wherein the instructions, when executed by the at least one computing device, are configured to cause the at least one computing device to:

store a second subset of the sensor data in a second event file for a second start-specific event that is designated using the anonymous name; and aggregate the event file and the second event file, based on the anonymous name.

10. A computer-implemented method, comprising:

detecting, at a vehicle outfitted with a plurality of sensors configured to generate sensor data characterizing an environment of the vehicle, a start event of the vehicle;

generating, based on the start event, an anonymous name;

extracting, from the sensor data, a subset of the sensor data related to a start-specific event of the vehicle with respect to the environment;

storing the subset of the sensor data in an event file for the start-specific event that is designated using the anonymous name;

generating a folder name of at least one folder, the folder name including the anonymous name;

storing the event file in the at least one folder; and uploading the event file from the vehicle to an external network.

11. The method of claim 10, comprising:

generating a timestamp in response to the start event; and generating the anonymous name using the timestamp.

12. The method of claim 10, comprising:

generating the anonymous name, using a hashing algorithm.

13. The method of claim 10, wherein the start-specific event includes any detected event that occurs during a start-specific time window between the start event and a stop event of the vehicle when the vehicle is turned off.

14. The method of claim 10, comprising:

generating the anonymous name as being unique to the vehicle.

15. The method of claim 10, comprising:

storing a second subset of the sensor data in a second event file for a second start-specific event that is designated using the anonymous name; and aggregating the event file and the second event file, based on the anonymous name.

16. A vehicle comprising:

a chassis;

a frame mounted on the chassis;

a motor mounted within the frame;

a plurality of sensors mounted on the vehicle and configured to generate sensor data characterizing an environment of the vehicle;

at least one memory including instructions; and at least one processor that is operably coupled to the at least one memory and that is arranged and configured to execute instructions that, when executed, cause the at least one processor to detect, at the vehicle, a start event of the vehicle;

generate, based on the start event, an anonymous name;

extract, from the sensor data, a subset of the sensor data related to a start-specific event of the vehicle with respect to the environment;

store the subset of the sensor data in an event file for the start-specific event that is designated using the anonymous name;

generate a folder name of at least one folder, the folder name including the anonymous name;

store the event file in the at least one folder; and upload the event file from the vehicle to an external network.

17. The vehicle of claim 16, wherein the instructions, when executed by the at least one processor, are configured to cause the at least one processor to:

generate the anonymous name as being unique to the vehicle.

* * * * *